(12) United States Patent
Nishimura et al.

(10) Patent No.: US 12,157,281 B2
(45) Date of Patent: Dec. 3, 2024

(54) CONTINUOUS FORMING APPARATUS OF FIBER REINFORCED COMPOSITE

(71) Applicants: TSUDAKOMA KOGYO KABUSHIKI KAISHA, Ishikawa-ken (JP); KANAZAWA INSTITUTE OF TECHNOLOGY, Ishikawa (JP)

(72) Inventors: Isao Nishimura, Ishikawa-ken (JP); Kiyoshi Uzawa, Ishikawa (JP); Katsuhiko Nunotani, Ishikawa (JP)

(73) Assignees: TSUDAKOMA KOGYO KABUSHIKI KAISHA, Ishikawa-Ken (JP); KANAZAWA INSTITUTE OF TECHNOLOGY, Ishikawa (JP)

( * ) Notice: Subject to any disclaimer, the term of this patent is extended or adjusted under 35 U.S.C. 154(b) by 520 days.

(21) Appl. No.: 17/385,409

(22) Filed: Jul. 26, 2021

(65) Prior Publication Data

US 2022/0063218 A1 Mar. 3, 2022

(30) Foreign Application Priority Data

Aug. 27, 2020 (JP) ................. 2020-143148

(51) Int. Cl.
*B29C 70/56* (2006.01)
*B29C 70/52* (2006.01)

(52) U.S. Cl.
CPC ............ *B29C 70/56* (2013.01); *B29C 70/527* (2013.01)

(58) Field of Classification Search
None
See application file for complete search history.

(56) References Cited

U.S. PATENT DOCUMENTS

| 10,717,239 | B2* | 7/2020 | Gordon | B29D 99/0005 |
|---|---|---|---|---|
| 2004/0154147 | A1 | 8/2004 | Droux et al. | |
| 2006/0172644 | A1 | 8/2006 | Droux et al. | |
| 2009/0050263 | A1 | 2/2009 | Suzuki et al. | |
| 2010/0224309 | A1 | 9/2010 | Tashiro et al. | |
| 2016/0174681 | A1 | 6/2016 | Rehwinkel | |

FOREIGN PATENT DOCUMENTS

| CZ | 2003-2753 A3 | 1/2004 |
|---|---|---|
| WO | WO 2007/119371 A1 | 10/2007 |

OTHER PUBLICATIONS

Dec. 22, 2021, European Search Report issued for related EP Application No. 21188455.6.

* cited by examiner

*Primary Examiner* — Barbara J Musser
(74) *Attorney, Agent, or Firm* — Paratus Law Group, PLLC

(57) ABSTRACT

A continuous forming apparatus of a fiber reinforced composite includes a tension detection mechanism, a drive motor, and a drive control device. The drive control device is configured so that a material roll is rotationally driven in a delivery direction of a reinforced fiber base material during a time period from a time point of end of pressurization in a forming process to a time point of end of a pulling-out process, and is also configured to perform tension control on the reinforced fiber base material based on a detected tension value from the tension detection mechanism and a target tension value, during a time period from a time point of start of the pulling-out process to a time point of end of the pressurization in the forming process in a next forming operation.

6 Claims, 4 Drawing Sheets

CONTINUOUS FORMING APPARATUS OF FIBER REINFORCED COMPOSITE

CROSS-REFERENCE TO RELATED APPLICATION

The present application claims priority from Japanese Patent Application No. 2020-143148, filed on Aug. 27, 2020, the entire subject matter of which is incorporated herein by reference.

TECHNICAL FIELD

The present invention relates to a continuous forming apparatus of a fiber reinforced composite including a supply device to which a plurality of material rolls, each of which is formed by a sheet-like reinforced fiber base material wound in a roll shape, is mounted; a forming device configured to execute a forming process of pressurizing and heating the plurality of overlapped reinforced fiber base materials supplied from the supply device to form a fiber reinforced composite; and a pulling-out device configured to execute a pulling-out process of pulling out the fiber reinforced composite formed by the forming device by a predetermined pulling-out amount, wherein one forming operation consisting of the forming process by the forming device and the pulling-out process by the pulling-out device after the forming process is repeatedly performed, so that the fiber reinforced composite is continuously formed while pulling out the reinforced fiber base material from each of the material rolls.

BACKGROUND ART

In recent years, airplane-related components, vehicle-related components, sports/leisure products and the like are formed of fiber reinforced composites. The fiber reinforced composite is manufactured by stacking reinforced fiber base materials such as prepreg and then pressurizing and heating the stacked body.

For reference, the reinforced fiber base material (prepreg) is a material formed to have a sheet shape by impregnating a matrix resin into reinforced fibers such as a carbon fiber, a glass fiber, an aramid fiber and the like. In addition, examples of the reinforced fiber base material include a so-called unidirectional material (UD material) where reinforced fibers are arranged in one direction, a so-called fabric material where reinforced fibers are formed to have a fabric shape, and the like. Examples of the unidirectional material include a material where reinforced fibers are oriented in parallel (0° direction) to a longitudinal direction of a reinforced fiber base material formed to have a sheet shape, and a material where the reinforced fibers are oriented at 45° or 90° with respect to the longitudinal direction.

As an apparatus configured to continuously manufacture the fiber reinforced composite, known is a continuous forming apparatus disclosed in WO2007/119371, for example. The continuous forming apparatus includes a supply device to which a plurality of material rolls (original base material), each of which is formed by a sheet-like reinforced fiber base material wound in a roll shape, is mounted. In the continuous forming apparatus, the reinforced fiber base materials pulled out from the plurality of the material rolls mounted to the supply device are pressurized and heated in a forming device provided on a downstream side of the supply device, and are thus formed as a fiber reinforced composite.

Further, in the continuous forming apparatus, the forming of the fiber reinforced composite is sequentially and continuously performed. Therefore, the continuous forming apparatus has a pulling-out device configured to pull out the formed fiber reinforced composite toward a downstream side and provided on a downstream side of the forming device. In the continuous forming apparatus, subsequently to the forming process by the forming device, a pulling-out process of pulling out the fiber reinforced composite formed in the forming process toward a downstream side is executed, and the forming process and the pulling-out process are repeated in corresponding order, so that the fiber reinforced composite is continuously formed. The fiber reinforced composite is pulled out toward the downstream side in the pulling-out process, so that each reinforced fiber base material connected to the fiber reinforced composite and to the material roll is also pulled out from the material roll,

SUMMARY OF INVENTION

In the continuous forming apparatus of WO2007/119371, the supply device has a support shaft to which each material roll is mounted. The support shaft is fixedly provided to a support post or the like, and each material roll is rotatably hung (supported) on the support shaft. Therefore, the material roll is rotated as the reinforced fiber base material is pulled out from the material roll. However, such rotation is passive rotation that is caused as the reinforced fiber base material is pulled out. That is, the pulling-out of the reinforced fiber base material from the material roll is performed with rotating the material roll in such a way.

Note that, the material roll that is mounted to the support shaft has basically a large diameter. The reason is to make frequent replacement of the material roll unnecessary, thereby efficiently performing the forming of the fiber reinforced composite. Since the large-diameter material roll is considerably heavy in weight, its rotational resistance becomes high in rotating the material roll mounted as described above.

For this reason, in a state where a winding diameter of the material roll is large, when pulling out the reinforced fiber base material from the material roll as the material roll is caused to rotate, the high load is applied to the reinforced fiber base material being pulled out due to the high rotational resistance. As a result, the reinforced fiber base material that reaches the forming device may be damaged. In particular, in a case where the reinforced fiber base material is the above-described material where the orientation direction of the reinforced fibers has an angle with respect to the longitudinal direction of the base material, the reinforced fiber base material is vulnerable to the load in a direction in which the base material is pulled out, and is thus broken.

Further, when the forming of the fiber reinforced composite is continuously performed, as described above, the winding diameter of the material roll becomes smaller, so that the rotational resistance is gradually reduced. Accordingly, the problem that is caused due to the load applied to the reinforced fiber base material does not occur.

On the other hand, when the winding diameter of the material roll becomes small, as the reinforced fiber base material is pulled out from the material roll, the rotation of the material roll is not immediately stopped even though the pulling-out by the pulling-out device is ended so as to stop the pulling-out of the fiber reinforced composite. Therefore, the material roll uselessly rotates by the inertia.

As a result, the reinforced fiber base material is superfluously supplied, so that the reinforced fiber base material may be loosened at the time of start of the forming process. In this case, since the forming process by the forming device is executed in a state where the tension of the reinforced fiber base material is not appropriate, so that a quality of the fiber reinforced composite is badly influenced (the quality is lowered).

In view of the above situations, an object of the present invention is to provide a. continuous forming apparatus configured to continuously form a fiber reinforced composite while pulling out a reinforced fiber base material from a material roll, and capable of preventing the above-described problems.

A continuous forming apparatus of a fiber reinforced composite of the present invention includes: a supply device to which a plurality of material rolls, each of which is formed by a sheet-like reinforced fiber base material wound in a roll shape, is mounted; a forming device configured to execute a forming process of pressurizing and heating the plurality of overlapped reinforced fiber base materials supplied from the supply device to form a fiber reinforced composite; and a pulling-out device configured to execute a pulling-out process of pulling out the fiber reinforced composite formed by the forming device by a predetermined pulling-out amount. And, in the continuous forming apparatus of the fiber reinforced composite of the present invention, one forming operation consisting of the forming process by the forming device and the pulling-out process by the pulling-out device after the forming process is repeatedly performed, so that the fiber reinforced composite is continuously formed while pulling out the reinforced fiber base material from each of the material rolls. The above is a premise of the continuous forming apparatus of the fiber reinforced composite of the present invention.

In addition, the continuous forming apparatus of the fiber reinforced composite of the present invention includes: one or more drive motors for rotationally driving the material rolls, the number of the drive motors being equal to or smaller than a total number of the material rolls and all the material rolls corresponding to any one of the drive motors; a tension detection mechanism provided to detect tension of the reinforced fiber base materials pulled out from the one or more material rolls of the material rolls corresponding to the drive motors; and a drive control device configured to control drive of the drive motor so that the material roll is rotationally driven in a delivery direction of the reinforced fiber base material during a time period from a time point of end of the pressurization in the forming process to a time point of end of the pulling-out process, wherein a time period from a time point of start of the pulling-out process to a time point of end of the pressurization in the forming process in a next forming operation is preset as a tension control time period, and the drive control device executes tension control for controlling drive of the drive motor based on a detected tension value, which is obtained from a detected value obtained by the tension detection mechanism, and a target tension value that is a preset target tension value, during the tension control time period.

Further, in the continuous forming apparatus of the present invention, the tension control time period may be set to a time period from the time point of end of the pulling-out process to the time point of end of the pressurization of the forming process in a next forming operation. The drive motor may be provided for each of the material rolls. When the drive motor is provided for each of the material rolls, the continuous forming apparatus of a fiber reinforced composite of the present invention may include, as a setting device in which the target tension value is set, a setting device capable of setting the target tension value for each of the material rolls.

According to the present invention, the continuous forming apparatus is provided with the drive motor for rotationally driving the material roll, and the drive motor is driven so that the material roll is rotationally driven during the time period from the time point of end of the pressurization in the forming process to the time point of end of the pulling-out process. In this way, the high load due to the weight of the material roll is not applied to the reinforced fiber base material that is pulled out as the fiber reinforced composite is pulled out in the pulling-out process. Therefore, it is possible to prevent the reinforced fiber base material from being damaged, and also to prevent the break of the reinforced fiber base material when the reinforced fiber base material is a material where the orientation direction of the reinforced fibers has an angle with respect to the longitudinal direction of the base material.

Further, according to the present invention, the tension control time period is preset to the time period from the time point of start of the pulling-out process to the time point of end of the pressurization in the forming process in the next forming operation, and during the tension control time period, the tension control is executed based on the detected tension value obtained from the detected value obtained from the tension detection mechanism and the target tension value that is a preset target tension value. In this way, since the forming process by the forming device is executed in a state where the tension of the reinforced fiber base material is appropriate, it is possible to prevent the quality of the fiber reinforced composite from being lowered as much as possible.

Further, in the continuous forming apparatus of the present invention, when the tension control time period is set to a time period from the time point of end of the pulling-out process to the time point of end of the pressurization in the forming process in the next forming operation, the tension control can be executed in a simpler aspect.

More specifically, in the present invention, the tension control time period may be set to a time period of the pulling-out process, specifically, a time period during which the tension continues to change as the reinforced fiber base material is pulled out. However, in this case, the tension control should be executed so as to optimize the tension each time in a situation where the tension of the reinforced fiber base material changes continuously or intermittently.

In contrast, when the tension control time period is set to the time period from the time point of end of the pulling-out process to the time point of end of the pressurization in the forming process in the next forming operation, after the pulling-out process in which the tension of the reinforced fiber base material changes as described above is over, i.e., after the change in tension has subsided, the tension control is executed. Therefore, the tension control can be executed in a simpler aspect because it is executed in a state where there is no change in tension due to the pulling-out.

Further, when the drive motor is provided for each of the material rolls so that each of the material rolls is individually rotationally driven, the tension control is executed for each reinforced fiber base material that is pulled out from each of the material rolls. In this way, it is possible to more accurately adjust the tension of each reinforced fiber base material to an appropriate state, so that it is possible to more securely prevent the above-described problems.

Further, when the setting device that can set the target tension value for each of the material rolls is provided, as the setting device in which the target tension value is set, it is possible to set the target tension value to a more appropriate value corresponding to each of the mounted material rolls. In this way, when the drive motor is provided for each of the material rolls, as described above, each tension control can be made more appropriate according to each of the material rolls.

BREIF DESCRIPTION OF DRAWINGS

DESCRIPTION OF EMBODIMENTS

Hereinafter, one embodiment of a continuous forming apparatus Ito which the present invention is applied will be described with reference to FIGS. 1 to 4. Note that, as described above, a reinforced fiber base material 2 of the present invention is formed to have a sheet shape by impregnating a matrix resin into reinforced fibers such as a carbon fiber, a glass fiber, an aramid fiber and the like. In the present embodiment, the reinforced fiber base material 2 is assumed as a thermoplastic prepreg 2 where a thermoplastic resin as a matrix resin is impregnated into carbon fibers as the reinforced fibers.

Figure 1:
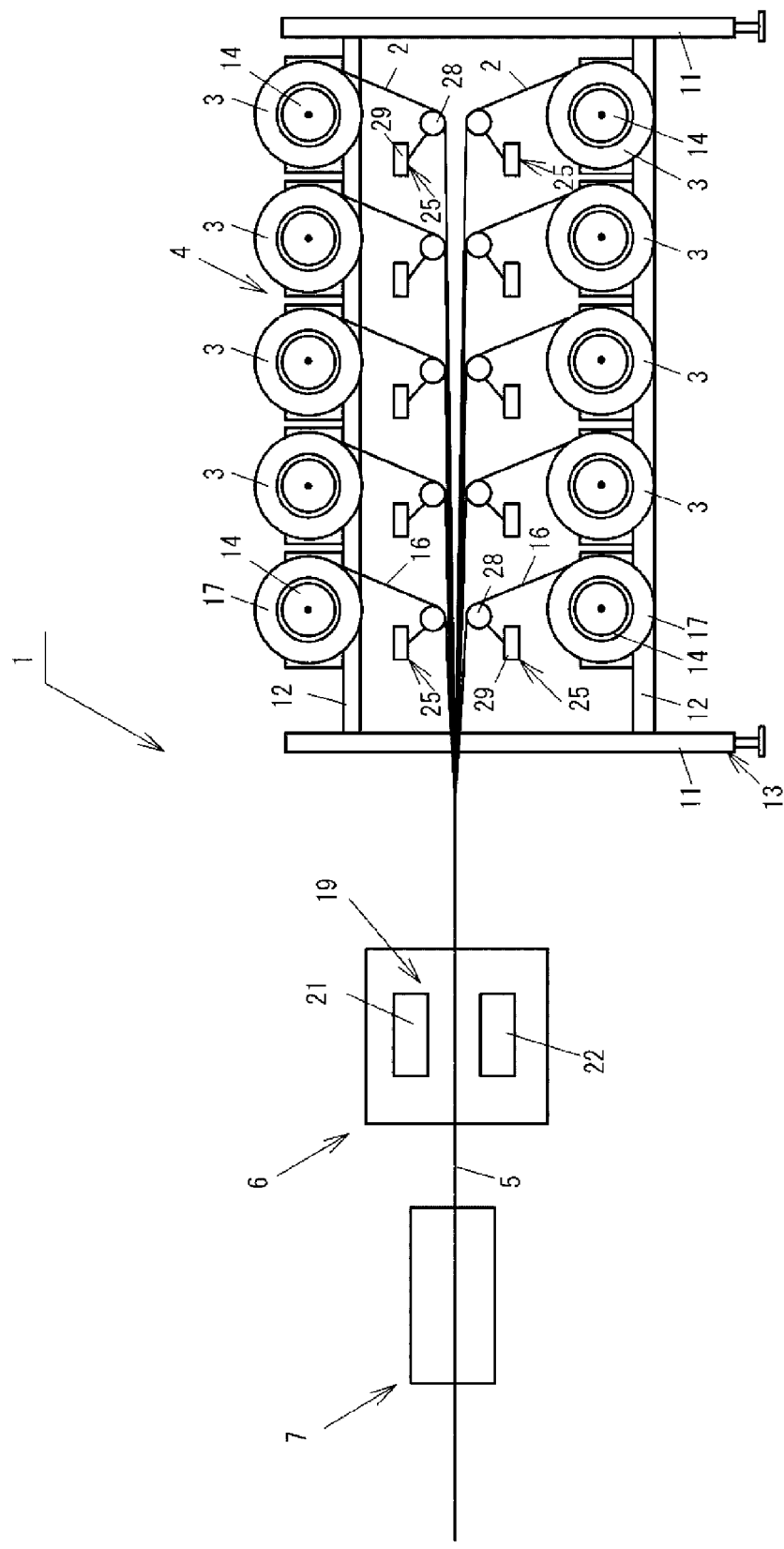
FIG. 1 depicts one embodiment of a continuous forming apparatus to which the present invention is applied.

As shown in FIG. 1, the continuous forming apparatus 1 includes a supply device 4 to which a plurality of material rolls 3, 3, . . . is mounted. As used herein, the material roll 3 is formed by a sheet-like prepreg (hereinafter, referred to as "prepreg sheet") 2 wound in a roll shape. The continuous forming apparatus I also includes a forming device 6 configured to form the plurality of prepreg sheets 2, 2, . . . supplied from the supply device 4 into a fiber reinforced composite 5, and a pulling-out device 7 configured to pull out the fiber reinforced composite 5 formed by the forming device 6.

Note that, in the forming device 6, a forming process of pressurizing and healing the plurality of prepreg sheets 2, 2, . . . supplied and overlapped to form the fiber reinforced composite 5 is executed. In the continuous forming apparatus 1, after the forming process is executed, a pulling-out process by the pulling-out device 7 is executed, and one forming operation including the forming process and the pulling-out process is repeatedly executed in corresponding order. Each of the devices of the continuous forming apparatus 1 is specifically described, as follows.

The supply device 4 is mainly constituted by a frame 13 consisting of a plurality of support posts 11, 11, . . . and a plurality of beam materials 12, 12, . . . The frame 13 is formed to constitute a frame body by the four support posts 11 extending upward from an installation surface and the plurality of beam materials 12 fixed to each of the support posts II in a form of being bridged between the respective support posts 11 at upper and lower portions of the support posts 11. The frame 13 is formed so that one of two sets of the beam materials 12 and 12 facing each other in a horizontal direction is sufficiently longer than the other to form a rectangular shape, as seen from above. In the below, a longitudinal direction of the beam material 12 on the short side is referred to as a width direction of the frame 13, and a longitudinal direction of the beam material 12 on the long side is referred to as a front and rear direction. 100291 The supply device 4 also has a plurality of support shafts 14 for supporting the material rolls 3. Note that, in the present embodiment, the supply device 4 is configured so that the ten material rolls 3, 3, . . . can be mounted. Therefore, the supply device 4 has the ten support shafts 14, 14, . . . The ten support shafts 14, 14, . . . are provided five by five on the upper and lower sides in a form of being supported by one side of the beam materials 12 facing in the width direction. Each of the support shafts 14 extends in the width direction from the beam material 12-side on the one side toward the beam material 12-side on the other side. The five support shafts 14, 14, . . . are aligned at equal intervals in the front and rear direction at the same height position on each of the upper and lower sides.

The interval between the support shafts 14 and 14 facing each other in the front and rear direction is set to be greater than an interval within which the fully-wound material roll 3 can be mounted, specifically, an outer diameter of the fully-wound material roll 3. An interval in the upper and lower direction is also set to be greater than the outer diameter of the fully-wound material roll 3. Note that, in the shown example, the five support shafts 14, 14, . . . on the upper side and the five support shafts 14, 14, . . . on the lower side are provided to be located at the same positions in the front and rear direction.

In the present embodiment, the material roll 3 that is mounted to the support shaft 14 is assumed to be formed by winding the above-described unidirectional material (UI) material) as the prepreg sheet 2. The material rolls 3 are not all the same, and are formed by the four types of the prepreg sheets 2 where the orientation directions of the reinforced fibers thereof relative to the longitudinal direction of the prepreg sheet 2 are 0° (parallel), ±45°, −45° and 90° directions. The four types of the material rolls 3 are mounted two by two, i.e., a total of the eight material rolls 3, 3, . . . are mounted to the supply device 4. The eight material rolls 3, 3, . . . are mounted so that the same types of material rolls are located at the same positions in the front and rear direction.

Further, in the present embodiment, it is assumed that two film rolls 17 and 17 each formed by winding a protection film 16 are mounted to the supply device 4, separately from the four types of the material rolls 3. The two film rolls 17 and 17 are mounted to the supply device 4 at positions on the most downstream side (forming device 6-side) in the pulling-out direction of the prepreg sheet 2 with respect to the front and rear direction.

The supply device 4 is configured as described above, so that the eight prepreg sheets 2, 2, . . . pulled out from the material rolls 3, 3, . . . mounted to the supply device 4 are pulled out at the same positions in the width direction in a state of being alined side by side in the upper and lower direction. In the supply device 4, the film rolls 17 and 17 are mounted as described above, the prepreg sheet 2 is pulled out from each of the material rolls 3, and at the same time, the protection films 16 are also pulled out from both the film rolls 17 and 17.

The protection films 16 are pulled out at the same time in this way, so that the two protection films 16 and 16 are pulled out above and below the prepreg sheets 2 and 2 aligned side by side as described above. In other words, with the pulling-out, the eight prepreg sheets 2, 2, . . . are pulled out in a state of being sandwiched between the two protection films 16 and 16 in the upper and lower direction. For reference, as described later, the protection film 16 is provided so as to prevent the heated prepreg sheets 2, 2, . . . from adhering to a pressing mold 19 in the forming device 6, in the forming process of heating and pressurizing the prepreg sheets 2, 2, . . . (hereinafter, the description of the protection film 16 is omitted).

As for the forming device 6, (although details are omitted in the relation to the present invention) the forming device 6 includes a pressing mold 19 for heating and pressurizing the plurality of prepreg sheets 2, 2, . . . supplied from the supply device 4. The pressing mold 19 has an upper mold 21 and a lower mold 22 each having a shape corresponding to a sectional shape of the fiber reinforced composite 5 to be formed. The upper mold 21 and the lower mold 22 are provided in the forming device 6 at upper and lower positions with respect to a path of the prepreg sheet 2 to be supplied. While the upper mold 21 and the lower mold 22 are heated, the upper mold 21 and the lower mold 22 are actuated to pressurize the plurality of prepreg sheets 2, 2, . . . on the path, so that one forming process of heating and pressurizing the prepreg sheets 2, 2, . . . to form the fiber reinforced composite 5 is executed.

The pulling-out device 7 is configured to be the same as the configuration of the conveying device disclosed in WO2007/119371 that is the above-described conventional technical document. The pulling-out device 7 is more specifically described, as follows.

The pulling-out device 7 is provided on a downstream side of the forming device 6 with respect to the pulling-out direction of the prepreg sheet 2 so as to pull out the fiber reinforced composite 5 formed by the forming device 6. The pulling-out device 7 also includes a gripping mechanism (not shown) configured to grip the formed fiber reinforced composite 5 and a pulling-out mechanism (not shown) configured to reciprocally move the gripping mechanism along the path of the fiber reinforced composite 5. The pulling-out mechanism also includes a servo motor (not shown) as a drive source, and is configured to actuate the gripping mechanism as the servo motor (output shaft) is driven (rotated).

Note that, the reciprocating movement of the gripping mechanism by the pulling-out mechanism includes forward movement from a standby position, which is an initial position of the gripping mechanism, toward the downstream side, and backward movement toward the standby position on an upstream side after the forward movement. An amount of the forward movement is matched with a preset pulling-out amount of the fiber reinforced composite 5. In addition, the pulling-out amount of the fiber reinforced composite 5 is set to an amount slightly smaller than a dimension of the pressing mold 19 in a direction of the path in the supply device 4, specifically, a formed length of the fiber reinforced composite 5 formed by one forming process.

The pulling-out device 7 is driven so that, after the one forming process is over, the pulling-out mechanism causes the gripping mechanism to move backward by the pulling-out amount in a state where the gripping mechanism grips the fiber reinforced composite 5. In this way, the pulling-out process of pulling out the formed fiber reinforced composite 5 toward the downstream side by the pulling-out amount is executed.

The pulling-out device 7 is also driven so that after the forward movement is completed, the gripping on the fiber reinforced composite 5 by the gripping mechanism is released. The pulling-out device 7 is also driven so that after the gripping by the gripping mechanism is released, the gripping mechanism is moved backward toward the standby position by the pulling-out mechanism. Then, the pulling-out device 7 is configured to drive the gripping mechanism to again grip the fiber reinforced composite 5 during a time period from a time point when the gripping mechanism reaches the standby position to a time point of end of a next forming process. In this way, the pulling-out device 7 is configured to execute the pulling-out process of moving forward the gripping mechanism from the standby position by the pulling-out amount and to move backward the gripping mechanism toward the standby position after the pulling-out process, every forming process.

The operations of the continuous forming apparatus I configured as described above are described in order from the forming process.

First, before the forming process starts, the plurality of prepreg sheets 2, 2, . . . is supplied from each of the material rolls 3 in the supply device 4 into the forming device 6. Then, when the forming process starts, the upper mold 21 and the lower mold 22 are heated and the plurality of prepreg sheets 2 is pressurized by the forming device 6, as described above. While the forming process is executed, the fiber reinforced composite 5 is gripped at the standby position by the gripping mechanism, in the pulling-out device 7.

When the forming process by the forming device 6 is over, the pulling-out process starts. In the pulling-out process, the pulling-out mechanism of the pulling-out device 7 is driven to cause the gripping mechanism to move forward. As a result, the fiber reinforced composite 5 formed in the forming device 6 is pulled out from the forming device 6 toward the downstream side, and a plurality of prepreg sheets 2, 2, . . . before forming is newly supplied into the forming device 6. Further, the fiber reinforced composite 5 is pulled out by the pulling-out process, so that the prepreg sheet 2 connected to each of the material rolls 3 mounted to the supply device 4 is also pulled out.

Then, after the pulling-out process is over, the gripping mechanism of the pulling-out device 7 is driven to release the gripped state of the fiber reinforced composite 5, and the pulling-out mechanism is driven to cause the gripping mechanism to move backward toward the standby position.

In this way, one forming operation including the forming process and the pulling-out process is completed. Thereafter, the forming process is again executed and the forming operation is repeated, so that the fiber reinforced composite 5 is continuously formed.

Figure 2:
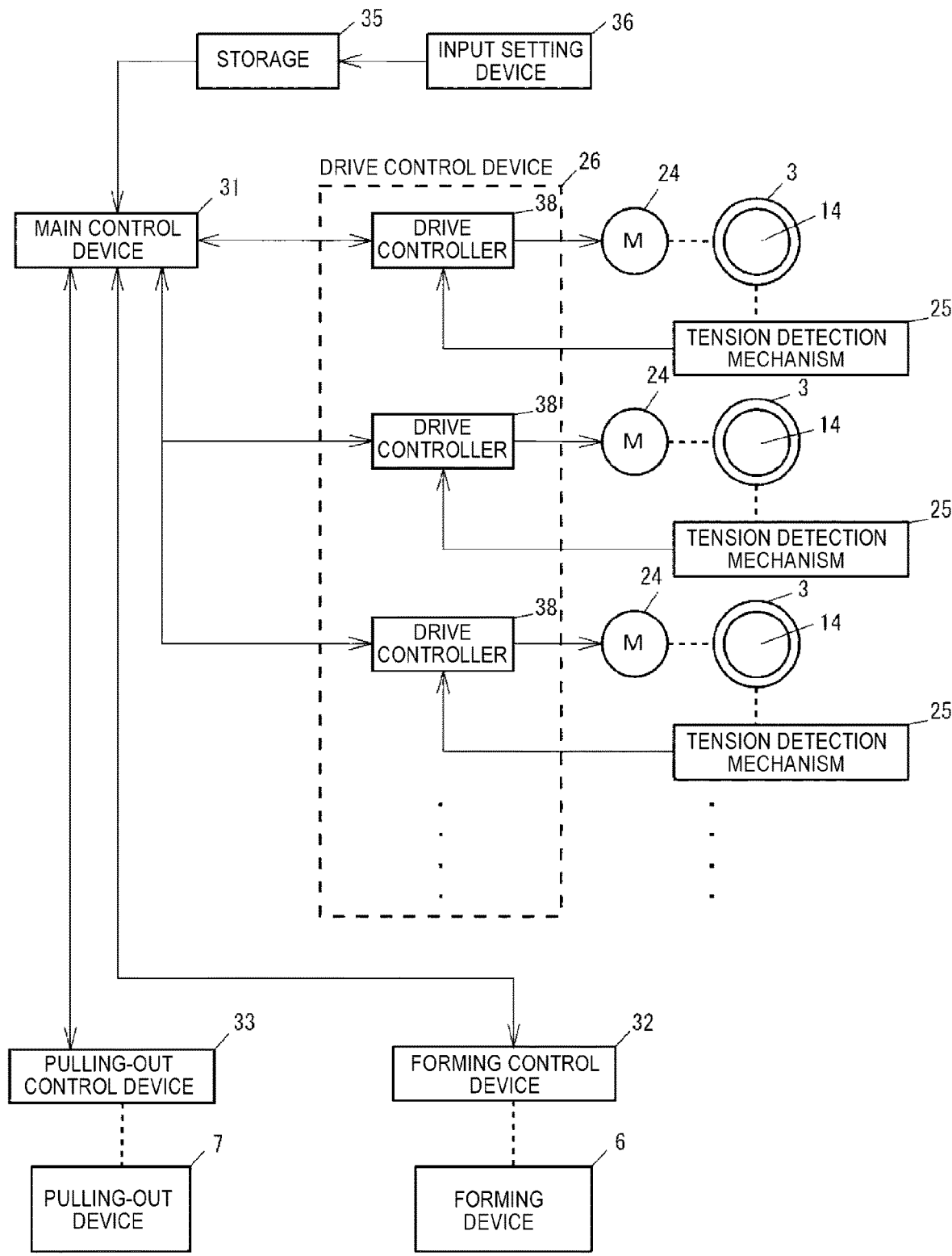
FIG. 2 is a block diagram showing a control configuration in one embodiment of the continuous forming apparatus.

In the continuous forming apparatus configured as described above, in the present embodiment based on the present invention, as shown in FIG. 2, the continuous forming apparatus 1 includes drive motors 24 for the supply device 4 to rotationally drive the material rolls 3, tension detection mechanisms 25 each provided so as to detect tension of the reinforced fiber base material (prepreg sheet) 2 pulled out from the material roll 3, and a drive control device 26 configured to control drive of the drive motors 24 so that the material rolls 3 are rotationally driven during a time period from a time point of end of pressurization in the forming process to a time point of end of the pulling-out process. Note that, in the present embodiment, the continuous forming apparatus 1 is configured to have the drive control device 26 configured to control drive of the drive motors 24 so that the material rolls 3 are rotationally driven during a time period (during pulling-out process) from a time point of start of the pulling-out process to a time point of end of the pulling-out process.

The drive control device 26 is also configured to execute tension control of controlling drive of the drive motor 24 based on a detected tension value obtained from a detected value obtained by the tension detection mechanism 25 and a target tension value that is a target tension, during a preset tension control time period. The tension control time period is a time period from the time point of start of the pulling-out process to the time point of end of the pressurization in the forming process in a next forming operation. In the present embodiment, the tension control time period is set as a time period from the time point of end of the pulling-out process to the time point of end of the pressurization in the forming process in a next forming operation.

Further, in the present embodiment, the continuous forming apparatus 1 has a configuration where the drive motor 24 is provided for each of the material rolls 3 and a setting device that can set the target tension value for each of the material rolls is provided. One embodiment (the present embodiment) of the continuous forming apparatus 1 is described in detail.

As described above, the supply device 4 has the ten support shafts 14, 14, . . . so as, to mount the ten material rolls 3, 3, . . . , as shown in FIG. 2. The supply device 4 has the ten drive motors 24, 24, . . . in a form corresponding to each of the support shafts 14. Each of the drive motors 24 is connected to the corresponding support shaft 14 so as to rotationally drive the material roll 3 mounted to each of the support shafts 14.

The support shaft 14 is rotatably supported by the beam material 12 on the one side via a support bracket (not shown), and is provided in such a form that an end portion (other end portion) opposite to an end portion (one end portion) in the extension direction thereof protrudes from the support bracket. Each of the drive motors 24 is attached to the support bracket by which the corresponding support shaft 14 is supported, in such an arrangement that a shaft center of an output shaft of the drive motor is matched with a shaft center of the corresponding support shaft 14. The drive motor 24 and the corresponding support shaft 14 are directly connected by a connecting member (not shown) such as a coupling at the output shaft of the drive motor 24 and the other end portion of the support shaft 14.

The supply device 4 has ten guide rolls 28, 28, . . . in a form corresponding to each of the support shafts 14 so that the prepreg sheet 2 of each of the material rolls 3 is pulled out along a desired path. Each of the guide rolls 28 is provided in such an arrangement that it is located at a position closer to the center-side than the corresponding support shaft 14 with respect to the upper and lower direction and a shaft center thereof is located on the slightly further downstream side than the shaft center of the support shaft 14 with respect to the front and rear direction. Note that, the guide rolls 28 corresponding to the upper support shafts 14, 14, . . . and the guide rolls 28 corresponding to the lower support shafts 14, 14, . . . are provided at same the height positions in the upper and lower direction.

The prepreg sheet 2 pulled out from the material roll 3 mounted to the support shaft 14 is wound on the guide roll 28 corresponding to the support shaft 14, and is pulled out toward the forming device 6 with the pulling-out direction thereof being reversed by the guide roll 28.

Each of the guide rolls 28 is supported by the beam material 12 by which the corresponding support shaft 14 is supported, via a load cell 29 provided for each of the guide rolls 28.

Figure 3:
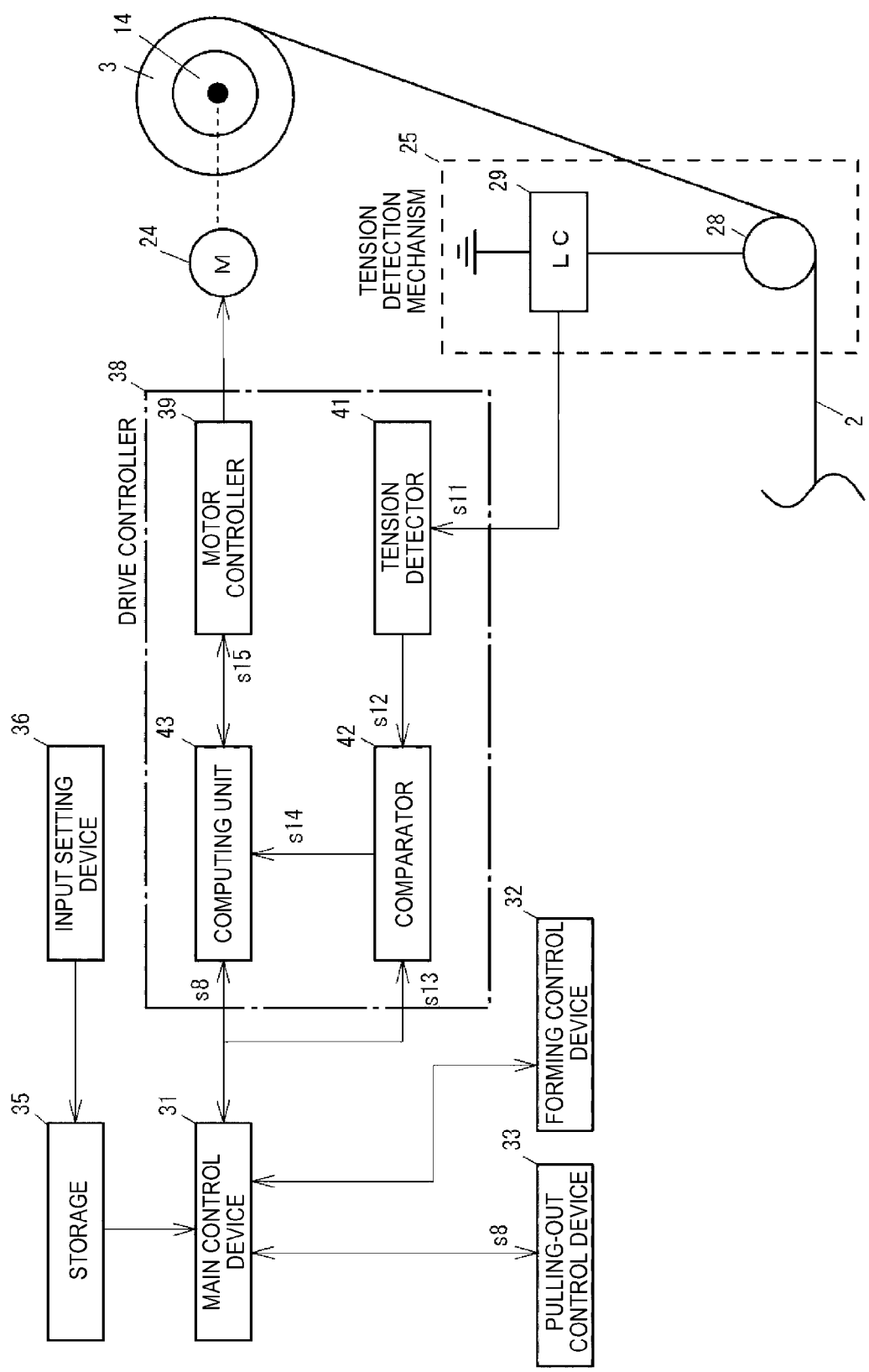
FIG. 3 is a block diagram showing details of some of the control configuration.

Further, as described above, the prepreg sheet 2 pulled out from each of the material rolls 3 is wound around the guide roll 28 in the pulling-out path, as shown in FIG. 3. Therefore, a load corresponding to the tension of the prepreg sheet 2 is applied to the guide roll 28. The load is applied to the load cell 29 that supports the guide roll 28, so that a signal corresponding to the load is output from the load cell 29. As shown in FIG. 2, the signal output from the load cell 29 is output toward the drive control device 26, so that the signal is used to obtain the detected tension value in the drive control device 26.

In this way, the guide roll 28 and the load cell. 29 function as a configuration for obtaining the detected value of the tension of the prepreg sheet 2. Therefore, a combination of the guide roll 28 and the load cell 29 is a constitutional element that constitutes the tension detection mechanism 25 of the present invention.

The continuous forming apparatus 1 includes the mechanical constitutional elements (devices) as described above. As shown in FIG. 2, the continuous forming apparatus 1 includes a main control device 31 for controlling its overall operations. Further, the continuous forming apparatus 1 includes a forming control device 32 configured to control drive of the forming device 6 configured to execute the forming process, a pulling-out control device 33 configured to control drive of the pulling-out device 7 configured to execute the pulling-out process, and a drive control device 26 configured to control drive of each of the drive motors 24 so as to rotationally drive each of the material rolls 3 and configured to execute the tension control. Each of the control devices 26, 32 and 33 is connected to the main control device 31. Note that, each of the control devices 26, 32 and 33 is bidirectionally communicatively connected to the main control device 31.

Further, the continuous forming apparatus 1 includes a storage 35 in which control information (control value) and the like for the controls are stored, and an input setting device 36 for an operator to input and set setting values necessary for the controls. In the storage 35, the target tension values for the tension control are also set and stored. Therefore, the storage 35 corresponds to the "setting device" of the present invention. The storage 35 is connected to the main control device 31, and the input setting device 36 is connected to the storage 35.

In the storage 35, a forming program configured so that the forming process is executed by the forming device 6 and the pulling-out process is then executed by the pulling-out device 7 and one forming operation including the forming process and the pulling-out process is repeatedly executed in corresponding order is stored. The main control device 31 is configured to output command signals and the like to each of the control devices 26, 32 and 33 based on the forming program so that the controls on drive of the forming device 6 and the pulling-out device 7 for executing the one forming operation are executed by the forming control device 32 and the pulling-out control device 33. This is specifically described as follows.

Figure 4:
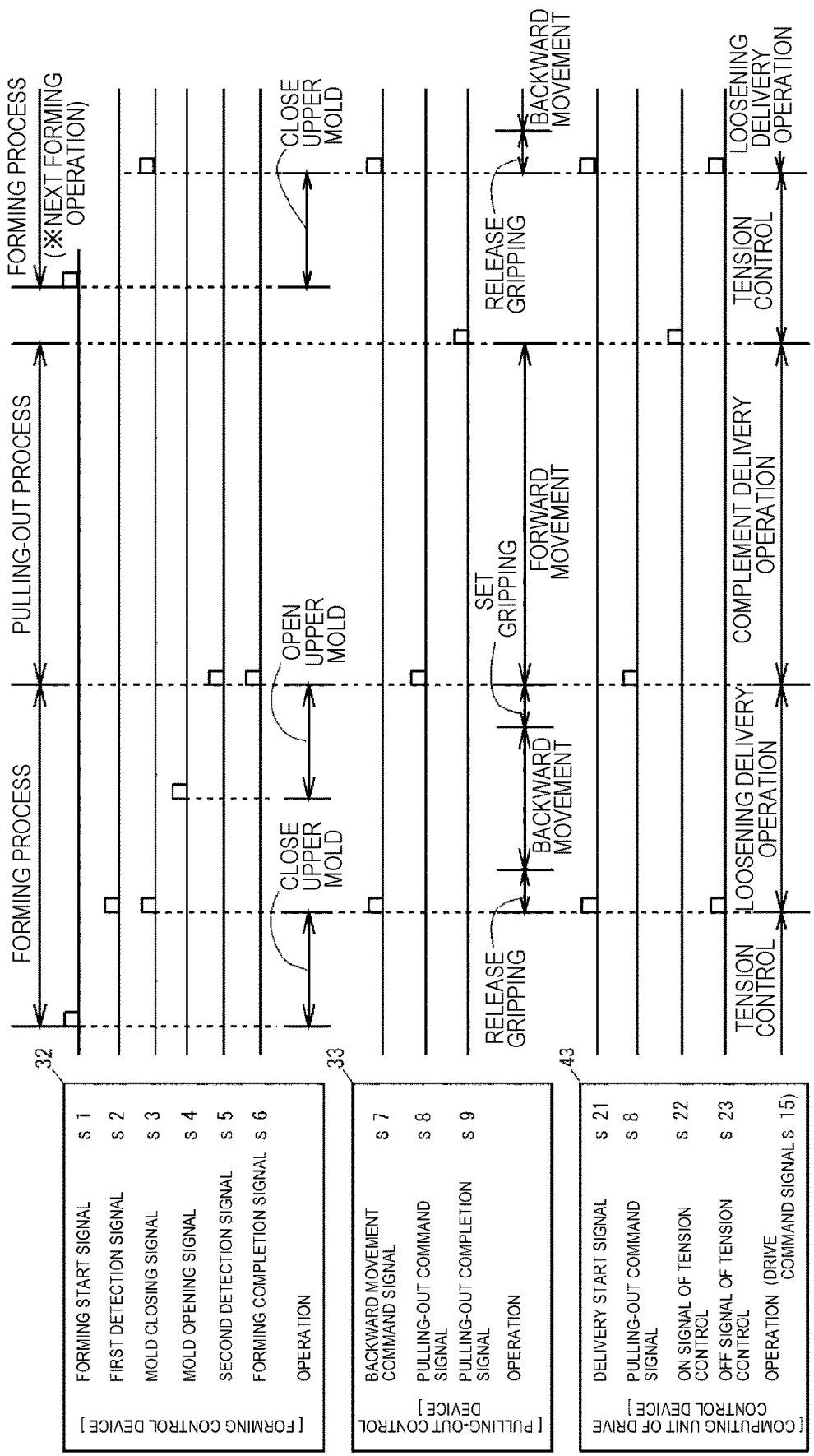
FIG. 4 is a timing chart showing an example of a control aspect in one embodiment of the continuous forming apparatus.

As described above, since the forming process is first executed, the main control device 31 outputs a forming start signal s1 to the forming control device 32, based on the forming program, as shown in FIG. 4. When the forming start signal s1 is input, the forming control device 32 starts drive control on a drive mechanism (not shown) configured to move the upper mold 21 so that the upper mold 21 of the forming device 6 moves from an initial position toward the lower mold 22.

Note that, the forming device 6 is provided with a position detection means for detecting a position of the upper mold 21. The position detection means is also configured to output a detection signal (first detection signal) s2 to the forming control device 32 at the time point when the upper mold 21 reaches a predetermined pressurizing position, i.e., at the time point when the pressing mold 19 is completely closed.

When the first detection signal s2 is output from the position detection means, the forming control device 32 stops moving of the upper mold 21 toward the lower mold 22, and outputs a signal (mold closing signal) s3 indicative of the stop to the main control device 31. The main control device 31 outputs, to the forming control device 32 a mold opening signal s4 for opening the pressing mold 19 (for moving the upper mold 21 away from the lower mold 22) at the time point when a time (pressurizing time) preset in the forming program elapses from the time point of the input of the mold closing signal s3, based on the mold closing signal s3.

The forming control device 32 starts drive control on the drive mechanism so as to move the upper mold 21 toward the initial position, in response to the input of the mold opening signal s4. The position detection means is also configured to output a detection signal (second detection signal) s5 to the forming control device 32 at the time point when the upper mold 21 reaches the initial position, specifically, at the time point when the pressing mold 19 is completely opened. When the second detection signal s5 is output from the position detection means, the forming control device 32 stops moving of the upper mold 21 toward the initial position, and a signal (forming completion signal) s6, which indicates that the forming process is over, to the main control device 31.

When the forming completion signal s6 is input, the main control device 31 outputs a pulling-out command signal s8 to the pulling-out control device 33 so as to execute (start) the pulling-out process based on the forming program.

Note that, at the time point when the forming start signal s1 is output from the main control device 31, the gripping mechanism of the pulling-out device 7 is located on the downstream side by the forward movement, and grips the fiber reinforced composite 5. Then, when the mold closing signal s3 is output from the forming control device 32, the main control device 31 outputs a backward movement command signal s7 to the pulling-out control device 33. When the backward movement command signal s7 is input, the pulling-out control device 33 releases the gripping of the fiber reinforced composite 5 by the gripping mechanism, and controls drive of the pulling-out device 7 so that the gripping mechanism is moved backward toward the standby position by the pulling-out mechanism.

The pulling-out device 7 further includes a rotation detection means (not shown) such as an encoder for detecting a rotation amount of the servo motor (output shaft) of the pulling-out mechanism. The pulling-out control device 33 is configured to compare a rotation amount (detected rotation amount) detected by the rotation detection means and the pulling-out amount preset in the storage 35. However, as described above, since the pulling-out mechanism is configured to rotate the gripping mechanism by rotation of the output shaft of the servo motor and a rotation amount of the output shaft and a moving amount of the gripping mechanism have a relationship indicated by a predetermined ratio, the pulling-out amount is also set by the rotation amount of the servo motor (output shaft).

When the backward movement command signal s7 is input, the pulling-out mechanism is driven by the pulling-out control device 33, so that the gripping mechanism moves to the standby position (backward movement). Note that, the drive is performed by feed-forward control using a pulse command, for example.

At the time point when the gripping mechanism reaches the standby position, the detected rotation amount and the pulling-out amount will be matched each other. Therefore, the pulling-out control device 33 compares the detected rotation amount and the pulling-out amount, as described above, and performs control of driving the gripping mechanism to grip the fiber reinforced composite 5 after a slight delay time elapses from the time point when both the amounts coincide with each other. In this way, at the standby position, the gripping mechanism grips the fiber reinforced composite 5.

Thereafter, when the forming completion signal s6 is output from the forming control device 32, the main control device 31 outputs a pulling-out command signal s8 to the pulling-out control device 33. When the pulling-out command signal s8 is input, the pulling-out control device 33 controls drive of the pulling-out device 7 so that the gripping mechanism is moved forward from the standby position toward the downstream side by the pulling-out amount by the pulling-out mechanism in a state where the gripping mechanism grips the fiber reinforced composite 5. In this way, the gripping mechanism is moved to a position on the downstream side by the forward movement. Note that, the control on the servo motor for movement (forward movement) of the gripping mechanism is performed based on a preset pulling-out time, in addition to the pulling-out amount.

More specifically, a desired time (pulling-out time) during which the pulling-out process is executed is preset in the storage 35. Therefore, the pulling-out control device 33 obtains a drive speed so that the movement of the pulling-out amount is completed within the set pulling-out time, and controls drive of the servo motor based on the obtained drive speed. In this way, the gripping mechanism is moved to reach a position on the downstream side at the time point when the pulling-out time elapses from the time point of the input of the pulling-out command signal s8, as described above.

Further, during the movement (forward movement), the rotation amount of the servo motor (output shaft) is detected by the rotation detection means, and the detected rotation amount and the pulling-out amount are compared by the pulling-out control device 33. The pulling-out control device 33 outputs a signal (pulling-out completion signal) s9, which indicates that the pulling-out process is over, to the main control device 31 at the time point when the detected rotation amount and the pulling-out amount coincide with each other. Then, in response to the input of the pulling-out completion signal s9, the main control device 31 outputs the forming start signal s1 to the forming control device 32, based on the forming program. In this way, the forming process in a next forming operation is again executed.

As described above, the continuous forming apparatus 1 continuously forms the fiber reinforced composite 5 by repeatedly executing one forming operation including the forming process by the forming device 6 and the pulling-out process by the pulling-out device 7 subsequent to the forming process. The continuous forming apparatus 1 of the present invention includes the drive control device 26 configured to control drive of each of the drive motors 24 so that each of the material rolls 3 is rotationally driven, as described above.

In the present embodiment, as shown in FIG. 2, the drive control device 26 includes a.

drive controller 38 provided in a form corresponding to each of the drive motors 24 and configured to control drive of the corresponding drive motor 24. In this way, the drive control device 26 of the present embodiment includes the drive controller 38 each provided for each of the drive motors 24, and each of the drive controllers 38 corresponds to the material roll 3 that is rotationally driven by the corresponding drive motor 24, and each of the tension detection mechanisms 25 provided to detect the tension of the prepreg sheet 2 pulled out from the material roll 3.

As shown in FIG. 3, each of the drive controllers 38 includes a motor controller 39 connected to the drive motor 24. Each of the drive controllers 38 includes, as constitutional elements, a tension detector 41 connected to the corresponding tension detection mechanism 25, a comparator 42 connected to the tension detector 41 and the main control device 31, and a computing unit 43 connected to the comparator 42, the main control device 31 and the motor controller 39. Note that, these constitutional elements are provided to execute the above-described tension control.

The tension detector 41 is configured to obtain the tension (tension value) of the prepreg sheet 2 every predetermined period, based on a signal (detected value signal) s11 corresponding to a load due to the tension of the prepreg sheet 2, which is output from the corresponding tension detection mechanism 25. The tension detector 41 is configured to output a signal (tension signal) s12 indicative of the obtained tension value (detected tension value) to the comparator 42 each time the detected tension value is obtained.

The comparator 42 is configured to compare the detected tension value indicated by the tension signal s12 and the target tension value set in the storage 35 and to obtain a deviation therebetween each time the tension signal s12 is input from the tension detector 41.

In the present embodiment, the storage 35 is configured to be able to set the target tension value for each of the material rolls 3, as described above, and as for the target tension value, it is assumed that a value corresponding to a type of the material roll 3 is set (stored) in the storage 35 for each of the material rolls 3. Further, it is assumed that the main control device 31 is configured to output the target tension value (a signal s13 indicative of the target tension value) set for the corresponding material roll 3 to the comparator 42 of each of the drive controllers 38 at the time point when the target tension value for each of the material rolls 3 is input and set in the storage 35 by the input setting device 36. It is also assumed that the comparator 42 is configured to store the target tension value output from the main control device 31 in a memory (not shown) provided therein.

Therefore, the comparison in the comparator 42 is performed between the detected tension value obtained by the tension signal s12 from the corresponding tension detector 41 and the target tension value set for the corresponding material roll 3. The comparator 42 is configured to obtain a value obtained by subtracting the target tension value from the detected tension value, as a deviation, and to output a deviation signal s14 indicative of the obtained deviation to the computing unit 43.

Since the material roll 3 is rotationally drive during the pulling-out process, the computing unit 43 is configured to output a drive command signal s15 for controlling drive of the drive motor 24 during the pulling-out process. In addition, the tension control is executed during the tension control time period set as described above, and the tension control is executed by controlling drive of the drive motor 24 while rotationally driving the material roll 3. Therefore, the computing unit 43 is configured to output the drive command signal s15 even during the tension control time period.

First, as for the control on the drive motor 24 during the pulling-out process, in the present embodiment, the control is performed so that movement of the prepreg sheet 2, which is actively delivered by rotationally driving the material roll 3, is substantially matched with movement of the fiber reinforced composite 5 due to movement (forward movement) of the gripping mechanism by the pulling-out device 7. Specifically, the pulling-out mechanism for moving the gripping mechanism of the pulling-out device 7 is driven so that the gripping mechanism is moved by the pulling-out amount within the preset pulling-out time, as described above. Therefore, the drive motor 24 for rotationally driving the material roll 3 during the pulling-out process is also controlled so that the prepreg sheet 2 is delivered from the material roll 3 by the pulling-out amount within the pulling-out time.

However, as the forming proceeds (the prepreg sheet 2 is consumed), the winding diameter of the material roll 3 gradually changes (becomes smaller). Therefore, the rotation amount of the material roll 3 (drive motor 24) for delivering the same amount of the prepreg sheet 2 also gradually changes. Therefore, the computing unit 43 is configured to obtain the winding diameter of the material roll 3 by computing. More specifically, a winding diameter of the material roll 3, and a thickness dimension of the prepreg sheet 2 at the start of forming are stored in an internal memory (not shown) of the computing unit 43. As for the winding diameter of the material roll 3, it is assumed that a winding diameter of the material roll 3 at the time of full winding is stored as an initial value in the internal memory of the computing unit 43.

Note that, as described above, the main control device 31 is configured to output the pulling-out command signal s8 to the pulling-out control device 33 so as to execute (start) the pulling-out process. The main control device 31 is also configured to output the pulling-out command signal s8 to the computing unit 43.

When the pulling-out command signal s8 is input, the computing unit 43 obtains the winding diameter of the material roll 3 from the winding diameter of the material roll 3, the pulling-out amount, and the thickness dimension of the prepreg sheet 2 stored in the internal memory by computing. The computing unit 43 is also configured to store the obtained winding diameter of the material roll 3 in the internal memory each time the winding diameter of the material roll 3 is obtained.

In this way, in the present embodiment, the winding diameter of the material roll 3 is obtained through computing by the computing unit 43. However, the present invention is not limited to the configuration where the winding diameter of the material roll 3 is obtained by the computing unit 43. For example, a winding diameter sensor may be arranged near each of the material rolls 3, and the winding diameter may be obtained based on a winding diameter signal output from the winding diameter sensor.

The computing unit 43 is also configured to obtain, from the obtained winding diameter of the material roll 3 and the pulling-out amount, a rotation amount of the material roll 3 for delivering the prepreg sheet 2 by the pulling-out amount and to obtain, from the obtained rotation amount and the pulling-out time, a rotating speed of the material roll 3 at which the delivery of the pulling-out amount is performed within the pulling-out time. However, in the present embodiment, as described above, since the support shaft 14 to which the material roll 3 is mounted and the output shaft of the drive motor 24 are directly connected to each other, the obtained rotation amount and rotating speed become an amount of drive and a drive speed for driving the drive motor 24. The computing unit 43 is configured to output the drive command signal s15, which includes information about the amount of drive and the drive speed, to the motor controller 39 at the time point when the rotation amount (amount of drive) and the rotating speed (drive speed) are obtained.

When the drive command signal s15 is input, the motor controller 39 is configured to control drive of the drive motor 24 so that the drive motor 24 is driven based on the amount of drive and the drive speed for driving the drive motor 24, By the above configuration, each of the material rolls 3 is rotationally driven to actively the prepreg sheet 2 at the time point when the pulling-out command signal s8 is input to the computing unit 43 of the corresponding drive controller 38, i.e., at the same time as when the pulling-out process (the pulling of the prepreg sheet 2) is started by the pulling-out device 7. Then, the prepreg sheet 2 is delivered from the material roll 3 at substantially the same speed as the moving speed due to the pulling-out by the pulling-out device 7, and is delivered by the pulling-out amount at the time point when the pulling-out time elapses.

Note that, in the present embodiment, although details are described later, as shown in FIG. 4, a loosening delivery operation is executed at the time point when the mold closing signal s3 is output from the forming control device 32 to the main control device 31. Thereby, the material roll 3 is rotationally driven, so that the prepreg sheet 2 is delivered from the material roll 3 by a preset amount so that the prepreg sheet 2 is in a slightly loosened state. Therefore, as described above, the prepreg sheet 2 is delivered from the material roll 3 by the pulling-out amount during the pulling-out process, and the prepreg sheet 2 is in a slightly loosened state at the time point when the pulling-out time elapses.

After the delivery of the prepreg sheet 2, the tension control is executed during the tension control time period. The control on the drive motor 24 for the tension control is performed so that the detected tension value is matched with the target tension value in each of the drive controllers 38 while rotationally driving (reverse rotation) each of the material rolls 3. Note that, the tension control time period is a time period from the time point of end of the pulling-out process to the time point of end of the pressurization in the forming process in a next forming operation, and specifically, is set to be a time period from a time point when the pulling-out control device 33 outputs the pulling-out completion signal s9 to a time point when the forming control device 32 outputs the mold closing signal s3 in a next forming operation.

The computing unit 43 of each of the drive controllers 38 is configured to obtain a drive speed for driving the drive motor 24, based on the deviation indicated by the deviation signal s14, each time the deviation signal s14 is input from the comparator 42, as described above. More specifically, a computing equation for obtaining a drive speed by using the deviation is preset in the computing unit 43. The computing unit 43 is configured to obtain a drive speed by using the computing equation, in response to the input of the deviation signal s14.

However, in the present embodiment, the tension control is executed (started) in a state where the prepreg sheet 2 is loosened as described above, i.e., in a state where the detected tension value is smaller than the target tension value, and is performed so that the detected tension value is matched with the target tension value. Therefore, the deviation indicated by the deviation signal s14 is mainly set to a value (negative value) smaller than 0 (zero). Since the drive speed of the drive motor 24 (rotating speed of the material roll 3) that is obtained by the computing unit 43 is obtained according to the deviation, when the deviation is a negative value, the drive speed is obtained as a negative rotating speed, specifically, a drive speed of the drive motor 24 at which the material roll 3 is rotated in a reverse rotation direction. For reference, when the deviation is a positive value, the obtained drive speed is a drive speed at which the material roll 3 is rotated in a forward rotation direction (a direction in which the prepreg sheet 2 is delivered, as described above).

In this way, the tension control of the present embodiment is performed in an aspect of obtaining a drive speed for driving the drive motor 24 based on the deviation obtained from the detected tension value and controlling drive of the drive motor 24 at the obtained drive speed.

Further, as described above, the main control device 31 is configured to output an ON signal s22 of the tension control for starting the tension control to the computing unit 43, in response to the input of the pulling-out completion signal s9, which is output from the pulling-out control device 33 as the pulling-out process is over. Further, as described above, the main control device 31 is configured to output an OFF signal s23 of the tension control for ending the tension control to the computing unit 43, in response to the input of the mold closing signal s3, which is output from the forming control device 32 as the pressurization is over.

The computing unit 43 is configured to output the drive command signal s15, which includes information about the drive speed obtained as described above, to the motor controller 39, in response to the input of the ON signal s22. Further, the computing unit 43 is configured to stop the output of the drive command signal s15, in response to the input of the OFF signal s23. Specifically, the computing unit 43 is configured to output the drive command signal s15, which includes information about the drive speed obtained as described above, to the motor controller 39, during the tension control time period from a time point of the input of the ON signal s22 to a time point of the input of the OFF signal s23.

Note that, the tension control where the drive of the drive motor 24 is controlled according to the drive speed obtained based on the detected tension value is performed in a state where the pulling-out device 7 configured to grip the fiber reinforced composite 5 to which the prepreg sheet 2 is connected is stopped. Therefore, as the material roll 3 is rotationally driven (reverse rotation) according to the tension control, the tension of the prepreg sheet 2 gradually increases. Therefore, the deviation gradually decreases, the drive speed that is obtained according to the deviation also gradually slows down, and the drive speed becomes zero (0) at the time point when the detected tension value coincides with the target tension value.

Further, the computing equation for obtaining the drive speed by using the deviation is set so that the drive speed (rotating speed), at which the detected tension value coincides with the target tension value before a time point (a time point when the pressurization in the forming device 6 is over) when the tension control time period is over as a result of the drive motor 24 being driven at the obtained drive speed and the material roll 3 being rotationally driven, is obtained. However, more preferably, the computing equation is set so that the drive speed (rotating speed), at which the detected tension value coincides with the target tension value before the forming process (pressurization) by the forming device 6 is started, is obtained, and in the present embodiment, it is assumed that the computing equation is set in such a manner.

Further, as described above, in the present embodiment, at the time point when the mold closing signal s3 is output from the forming control device 32 to the main control device 31, specifically, at the time point when the pressurization in the forming device 6 is over, the material roll 3 is rotationally driven (forward rotation) and the loosening delivery operation is performed so that the prepreg sheet 2 is in a state where it is slightly loosened by a preset amount (amount of delivery). Therefore, the computing unit 43 of each of the drive controllers 38 is configured to output the drive command signal s15 for the loosening delivery operation to the motor controller 39 at the time point when the pressurization in the forming device 6 is over.

More specifically, the amount of delivery in the loosening delivery operation is set as such an amount that the prepreg sheet 2 delivered from the material roll 3 is in a slightly loosened state, and is set in advance (stored) in the storage 35. Further, the main control device 31 is configured to output a delivery start signal s21 for starting the loosening delivery operation to the computing unit 43, in response to the input of the mold closing signal s3, which is output from the forming control device 32 as the pressurization is over, as described above.

The computing unit 43 is configured to obtain the winding diameter of the material roll 3 from the winding diameter of the material roll 3, the amount of delivery, and the thickness dimension of the prepreg sheet 2 stored in the internal memory, in response to the input of the delivery start signal s21, and to store the same in the internal memory. The computing unit 43 is also configured to obtain a rotation amount of the material roll 3 (an amount of drive of the drive motor 24) from the obtained winding diameter of the material roll 3 and the amount of delivery.

Further, a drive speed (loosening drive speed) of the drive motor 24 at which the loosening delivery operation starts in response to the input of the delivery start signal s21 and is then completed by the time point of start of the pulling-out process by the pulling-out device 7 (the time point when the forming process is over) is set, and the computing unit 43 is configured to output the drive command signal s15, which includes information about the loosening drive speed and the rotation amount of the drive motor 24 obtained as described above, to the motor controller 39, Note that, the loosening drive speed is set to a speed that can complete the loosening delivery operation, irrespective of the winding diameter of the material roll 3. The drive command signal s15 for the loosening delivery operation is output from the computing unit 43, so that the motor controller 39 controls drive of the drive motor 24 based on the drive command signal s15.

The loosening delivery operation that is performed as the drive motor 24 is driven is performed in a state where the pulling-out device 7 configured to grip the fiber reinforced composite 5, to which the prepreg sheet 2 is connected, is stopped. Therefore, at the time point of start of the pulling-out process, the prepreg sheet 2 is in a state where it is slightly loosened by the amount of delivery. Since the pulling-out process is executed (started) in a state where the prepreg sheet 2 is slightly loosened, the prepreg sheet 2 is in a slightly loosened state at the time point when the pulling-out process is over (the time point when the pulling-out time elapses after the pulling-out process is started).

The operations of the continuous forming apparatus 1 of the present embodiment including the supply device 4 and the drive control device 26 as described above are sequentially described.

In the forming process (forming device 6), as the upper mold 21 reaches the predetermined pressurization position, i.e., the pressurization is over and the mold closing signal s3 is output from the forming control device 32, when the delivery start signal s21 is output from the main control device 31 toward the computing unit 43, the drive command signal s15 for the loosening delivery operation is output from the computing unit 43, and the drive of the drive motor 24 is controlled by the motor controller 39, based on the drive command signal s15. In this way, each of the material rolls 3 is rotationally driven to deliver the prepreg sheet 2 by the amount of delivery, so that the prepreg sheet 2 connected to the formed fiber reinforced composite 5 is in a slightly loosened state before the pulling-out process is started.

Then, when the forming completion signal s6 is output from the forming control device 32 toward the main control device 31 at a time point when the pressurization time elapses from the time point when the pressurization is over and the pressing mold 19 is completely opened, i.e., at a time point when the forming process is completed, the pulling-out process by the pulling-out device 7 is started, and the control on drive of each of the drive motors 24 for a delivery operation (hereinafter, referred to as "complement delivery operation") of actively delivering the prepreg sheet 2 (complementing the prepreg sheet 2 being pulled out) from the material roll 3 by the same amount as a moving amount (the pulling-out amount) of the prepreg sheet 2 by the pulling-out process is executed by each of the drive controllers 38, as follows.

When the pulling-out command signal s8, which is output from the main control device 31 in response to the output of the forming completion signal s6 from the forming control device 32, is input to the computing unit 43 of each of the drive controllers 38, the computing unit 43 obtains the rotation amount (amount of drive) and rotating speed (drive speed) of the material roll 3 (drive motor 24) from the obtained winding diameter of the material roll 3 at that time, the pulling-out amount and the pulling-out time. Then, the computing unit 43 outputs the drive command signal s15, which includes information about the amount of drive and the drive speed, to the motor controller 39.

In this way, during the pulling-out process, each of the material rolls 3 is rotationally driven to actively deliver the prepreg sheet 2 having a length corresponding to the pulling-out amount within the pulling-out time, so that the prepreg sheet 2 is delivered from each of the material rolls 3 at substantially the same speed as the moving speed of the pulling-out device 7 due to the pulling-out of the prepreg sheet 2 by the pulling-out device 7. Therefore, as the fiber reinforced composite 5 is moved toward the downstream side by the pulling-out process, each prepreg sheet 2 that reaches the material roll 3 from the fiber reinforced composite 5 is also moved toward the downstream side. At this time, the complement delivery operation is executed according to the movement, so that the prepreg sheet 2 is actively delivered from each of the material rolls 3. In this way, even when the pulling-out process by the pulling-out device 7 is executed, each of the prepreg sheets 2 is kept in the slightly loosened state by the loosening delivery operation, during the movement.

When the pulling-out completion signal s9 is output from the pulling-out control device 33 toward the main control device 31 at the time point when the pulling-out process is over, the tension control is then executed. The tension control is executed to rotationally drive (reverse rotation) each of the material rolls 3 and to match the tension of the prepreg sheet 2 with the target tension. This is specifically described, as follows.

When the ON signal s22 of the tension control is input to the computing unit 43, in response to the input of the pulling-out completion signal s9, the computing unit 43 starts to output the drive command signal s15, which includes the information about the drive speed obtained based on the deviation signal s14 output from the comparator 42. However, the deviation signal s14 from the comparator 42 is output each time the tension-detected value is obtained (every predetermined period), based on the deviation obtained by comparing the tension-detected value obtained by the tension detector 41 and the target tension value. In the computing unit 43, the drive speed is obtained each time the deviation signal s14 is input.

The output of the drive command signal s15 from the computing unit 43 is started, so that the drive in reverse rotation direction of the drive motor 24 (material roll 3) rotationally driven (forward rotation) so as to deliver the prepreg sheet 2 during the pulling-out process is started. Note that, at the time point when the reverse rotation drive of the drive motor 24 (material roll 3) is started, the prepreg sheet 2 is in the state where it is loosened by the loosening delivery operation, and the deviation of the target tension value with respect to the detected tension value is the largest value in the negative direction. The drive command signal s15 that is output from the computing unit 43 at that time point is due to the drive speed of a magnitude corresponding to the deviation (absolute value), and is to drive the drive motor 24 in the reverse rotation direction.

When the drive motor 24 is driven in the reverse rotation direction in this way, the loosening of the prepreg sheet 2, which is connected to the fiber reinforced composite 5 that is gripped by the pulling-out device 7 and is in a still state, is gradually eliminated. Therefore, as the drive motor 24 (material roll 3) is driven in the reverse rotation direction and the loosening is gradually eliminated, the detected tension value of the prepreg sheet 2 gradually increases, and the absolute value of the deviation of the target tension value with respect to the detected tension value also gradually decreases. As a result, the drive speed obtained from the deviation also gradually slows down, and the rotating speed of the material roll 3 due to the reverse rotation drive also gradually slows down. When the detected tension value coincides with the target tension value as the detected tension value increases, the deviation becomes zero (0), so that the drive speed becomes zero (0). Therefore, the drive of the drive motor 24 in the reverse rotation direction is stopped at that time point.

Note that, the drive speed with respect to the deviation in driving the drive motor 24 in the reverse rotation direction is obtained as a speed at which the detected tension value coincides with the target tension value before the tension control time period is over (before the pressurization in the forming device 6 is over) and before the forming process (pressurization) in the forming device 6 starts, as described above. Therefore, at the time point when the drive of the drive motor 24 in the reverse rotation direction is stopped, the tension control time period is not over yet and the tension control continues. As a result, even after the detected tension value and the target tension value coincide with each other, if the tension of any one prepreg sheet 2 changes due to any cause and a deviation occurs between the detected tension value and the target tension value, the drive of the drive motor 24 is controlled based on the deviation, so that the tension of each of the prepreg sheets 2 is maintained until the tension control time period is over.

When the OFF signal s23 of the tension control is output to the computing unit 43 in response to the end of the pressurization in the forming process (generation of the mold closing signal s3), the computing unit 43 stops the output of the drive command signal s15 for the tension control to the motor controller 39. As a result, the tension control is stopped (ended). In addition, when the delivery start signal s21 is output from the main control device 31 toward the computing unit 43, in response to the generation of the mold closing signal s3, the drive command signal s15 for the loosening delivery operation is output from the computing unit 43 to the motor controller 39, so that the loosening delivery operation is again performed.

According to the continuous forming apparatus 1 as described above, during the pulling-out process, the prepreg sheet 2 is actively delivered from the material roll 3, as described above. Therefore, as compared to the related art where the prepreg sheet 2 is passively pulled out from the material roil 3, in response to the pulling-out of the fiber reinforced composite 5 by the pulling-out device 7, the load that is applied to the prepreg sheet 2 is reduced. Therefore, it is possible to prevent the prepreg sheet 2 from being damaged and broken as much as possible.

Further, according to the continuous forming apparatus 1 of the present embodiment, before the pulling-out process is started, the loosening delivery operation is executed, so that the prepreg sheet 2 is in a slightly loosened state, and during the pulling-out process, the prepreg sheet 2 is actively delivered in a state where the loosened state is maintained. As a result, during the pulling-out process, since the prepreg sheet 2 is moved in conformity to the movement of the fiber reinforced composite 5 in a state where the load is little applied to the prepreg sheet 2, it is possible to prevent the prepreg sheet 2 from being broken more securely.

According to the continuous forming apparatus 1 of the present embodiment, the prepreg sheet 2 in the loosened state at the time point of end of the pulling-out process is returned to a state where the tension is matched with the target tension by the tension control before the forming process is started, and the tension is maintained until the pressurization in the forming process is over. In this way, since the forming process by the forming device 6 is performed in a state where the tension of the prepreg sheet 2 is appropriate, it is possible to prevent the bad influence on the quality of the fiber reinforced composite 5.

101151 Note that, the present invention is not limited to one embodiment (the above embodiment) of the continuous forming apparatus as described above, and can also be implemented in other embodiments (modified embodiments) as described in following 1) to 8) items.

1) As for the tension control time period, in the above embodiment, the tension control is performed so that the tension of the prepreg sheet 2 in the loosened state at the time point of end of the pulling-out process is matched with the target tension and is maintained at the target tension. The tension control time period during which the tension control is executed is set as a time period from the time point of end of the pulling-out process to the time point of end of the pressurization in the forming process in a next forming operation. However, in the present invention, even when the tension control is executed as described in the above embodiment, the tension control time period is not limited to the time period set as described in the above embodiment, First, the time point of end of the tension control time period may be earlier than a time point when the pressurization in the forming process is over (a time point of end of pressurization). However, the time point of end is set, considering following matters.

After the detected tension during the tension control time period is matched with the target tension, the tension of each of the prepreg sheets 2 by the tension control is maintained at the target tension. At the time point of end of the pressurization in the forming process. each of the prepreg sheets 2 is completely restrained by the pressing mold 19. Due to these causes, when there is a time period between the time point of end of the tension control time period and the time point of end of the pressurization in the forming process, each of the prepreg sheets 2 is in an unrestrained state or in a state close thereto during the time period, and the tension is lowered depending on a length of the time period, which may badly influence the forming process. Therefore, the time point of end of the tension control time period is set to be within a time period during which a time period between the time point of end of the tension control time period and the time point of end of the pressurization in the forming process does not have a bad influence on the forming process. Note that, the time point of end is not limited to a time point prior to the time point of end of the pressurization in the forming process, and may also be set to a time point after the time point of end of the pressurization so that the tension control continues even after the time point of end of the pressurization.

Further, the time point of start of the tension control time period may be later than the time point of end of the pulling-out process. However, the time point of start of the tension control time period is set, considering following matters.

The tension control should be executed so that the tension of the prepreg sheet 2 is matched with the target tension until the time point of end of the tension control time period. For this reason, in a case where a loosened amount of the prepreg sheet 2 (a delivery amount by the loosening delivery operation) is the same as the above embodiment, when a set tension control time period is shorter than the above embodiment, the drive speed of the drive motor 24 should be accordingly increased during the tension control. However, if the drive speed is increased, the prepreg sheet 2 may be damaged or the tension control may not be appropriately performed, depending on the speed. Therefore, the time point of start of the tension control time period is set so that the tension control time period determined at the time point of start with respect to the time point of end is a time period for which a drive speed, which does not cause the problems, is obtained.

2) As for the computing equation, in the above embodiment, the control on drive of each of the drive motors 24 during the tension control time period is performed using the drive speed of the drive motor 24 obtained based on the deviation between the detected tension value and the target tension value. The drive speed is obtained from the deviation by using the computing equation set in the computing unit 43. The computing equation is set so that the drive speed obtained in this way is a drive speed at which the detected tension value is matched with the target tension value before the time point of end of the tension control time period (the time point of end of the pressurization in the forming device 6) and before the time point of start of the forming process (pressurization) in the forming device 6. However, when the tension control is executed as described in the above embodiment, the computing equation for obtaining the drive speed of the drive motor 24 for the control is not limited to the above described setting, and may be set so that the drive speed at which the detected tension value is matched with the target tension value after the time point of start of the forming process as long as it is before the time point of end of the tension control time period.

3) As for the delivery operation, in the above embodiment, during the pulling-out process, the complement delivery operation of delivering the prepreg sheet 2 by the pulling-out amount (complementing the prepreg sheet 2 being pulled out) is executed, and the loosening delivery operation separate from the complement delivery operation is executed before the start of the pulling-out process so that the prepreg sheet 2 is in a slightly loosened state at the time point of end of the pulling-out process. However, in the case where the tension control is executed as described in the above embodiment, the delivery operation (the loosening deliver operation+the complement delivery operation) for putting the prepreg sheet 2 in a slightly loosened state at the time point of end of the pulling-out process is not limited to the above embodiment, and may be executed as described in following 3-1) and 3-2), for example.

As for the time period during which the complement delivery operation is executed, in the above embodiment, the complement delivery operation is started at the time point of start of the pulling-out process. In addition, the complement delivery operation is performed so that it is over at the time point of end of the pulling-out process. However, the time point of start of the complement delivery operation may be later than the time point of start of the pulling-out process. However, the time point of start of the complement delivery operation should be set, considering the pulling-out speed (the drive speed of the gripping mechanism of the pulling-out device 7) of the prepreg sheet 2 in the pulling-out process so that the loosening of the prepreg sheet 2 is not eliminated as the pulling-out process is executed.

Further, the time point of end of the complement delivery operation may be earlier than the time point of end of the pulling-out process. However, the time point of end of the complement delivery operation should be set so that the drive speed for rotationally driving the material roll 3 is a speed at which the appropriate rotational drive of the material roll 3 for delivering the prepreg sheet 2 of the assumed amount of delivery (=the pulling-out amount) is achieved.

More specifically, when the time point of end of the complement delivery operation is set to be earlier than the time point of end of the pulling-out process, as described above, the execution time period of the complement delivery operation is accordingly shortened, so that the drive speed of the drive motor 24 (the rotating speed of the material roll 3) during the complement delivery operation is increased. When the rotating speed of the material roll 3 is increased in this way, the inertia increases in stopping the rotation of the material roll 3 at the time point of end of the complement delivery operation In addition, the larger the winding diameter of the material roll 3, the greater the inertia is. When the inertia increases, the rotation of the material roll 3 does not stop at the time point when the prepreg sheet 2 of the assumed amount of delivery is delivered and the material roll 3 uselessly rotates, so that a larger amount of the prepreg sheet 2 than the assumed amount of delivery may be delivered. Note that, if the larger amount of the prepreg sheet 2 than the assumed amount is delivered, the loosening of the prepreg sheet 2 is increased at the time point of end of the pulling-out process, which may badly influence the subsequent tension control.

Therefore, the time point of end of the complement delivery operation should be set so that the drive speed of the drive motor 24 for rotationally driving the material roll 3 is to be a speed at which the rotational drive of the material roll 3, which delivers the prepreg sheet 2 of the assumed amount of delivery without badly influencing the tension control, is performed.

3-2) As for the delivery operation, in the above embodiment, the delivery by which the prepreg sheet 2 is loosened and the delivery of complementing the moving of the prepreg sheet 2 by the pulling-out process are each performed by the dedicated delivery operations (the loosening delivery operation and the complement delivery operation). However, the deliveries for putting the prepreg sheet 2 in a loosened state at the time point of end of the pulling-out process are not limited to being executed by the independent delivery operations, and may be executed by a single delivery operation, Note that, in this case, the prepreg sheet 2 is delivered by an amount (total amount of delivery), which corresponds to a summed amount of the amount of delivery for loosening and the amount of delivery corresponding to the pulling-out amount, through the single delivery operation. The single delivery operation may be performed during the pulling-out process, for example. In this case, the delivery operation (loosening delivery operation) before the start of the pulling-out process, as described in the above embodiment, is omitted, and the delivery operation during the pulling-out process is executed at a drive speed (a speed considering the total amount of delivery) higher than the above embodiment.

A time point of start of the single delivery operation may be earlier than the time point of start of the pulling-out process as long as the time point is later than the time point of end of the pressurization in the forming process. In addition, a time point of end of the single delivery operation may be earlier than the time point of end of the pulling-out process. However, the time point of end of the single delivery operation should be set within a range in which the drive speed for rotationally driving the material roll 3 is an appropriate speed, considering the time period of the delivery operation determined in this way and the inertia of the material roll 3 as described above.

4) As for the tension control, in the above embodiment, after the pulling-out process is over, the tension control is executed so that the tension of the prepreg sheet 2 in a loosed state at the time point of end of the pulling-out process is matched with the target tension. However, the tension control of the present invention may be executed so that the tension of the prepreg sheet 2 is maintained at the target tension, during the pulling-out process. Note that, in this case, the loosening delivery operation that is executed earlier than the pulling-out process may be omitted.

Specifically, the tension control is executed as follows. When the loosening deliver operation is omitted, the tension of each of the prepreg sheets 2 is in a state where the tension is close to (substantially matches) the target tension at the time point of start of the pulling-out process. As the pulling-out process (the forward movement of the gripping mechanism) starts, the delivery of the prepreg sheet 2 from each of the material rolls 3 in the supply device 4 is started, like the above embodiment.

Note that, as for the control on drive of each of the drive motors 24 for the delivery, the drive is started at a drive speed (basic speed) obtained from the winding diameter of the material roll 3, the pulling-out amount and the pulling-out time, like the above embodiment. However, in this example, the drive command (signal) that is output from the computing unit to the motor controller in each of the drive controllers is a speed command corresponding to the drive speed obtained by the computing unit. While the drive command is output from the computing unit, it is assumed that the motor controller is configured to execute control by which the drive motor 24 is driven at the drive speed indicated by the drive command. As described above, when starting the pulling-out process, the pulling-out command signal s8 that is output from the main control device 31 is also output to the computing unit 43 in each of the drive control devices 26. However, it is assumed that each of the computing units is configured to start to output the drive command, in response to the input of the pulling-out command signal s8.

In addition, as described above, the pulling-out completion signal s9 that is output from the pulling-out control device 33 in response to the end of the pulling-out process is input to the main control device 31. At this time, it is assumed that the pulling-out completion signal s9 is also input to the computing unit of each of the drive controllers via the main control device 31. It is assumed that each of the computing units is configured to stop the output of the drive command, in response to the input of the pulling-out completion signal s9. Therefore, according to the computing unit, during a time period (=a time period of the pulling-out process) from the generation of the pulling-out command signal s8 to the generation of the pulling-out completion signal s9, the drive command is output from each of the computing units, and each drive controller controls drive of the corresponding drive motor 24 so that each of the drive motors 24 is driven at a drive speed indicated by the drive command, during the time period.

Further, in this example, the control on drive of each of the drive motors 24 during the time period is performed together with the tension control. For this reason, each of the computing units is configured to correct the drive speed in the output drive command, based on the deviation between the detected tension value and the target tension value obtained by the comparator 42, as described above. Specifically, each of the computing units starts to output the drive command, in response to the input of the pulling-out command signal s8, as described above. At this time, as the pulling-out command signal s8 is input (the drive command is output), an amount of correction of the drive speed is obtained from the deviation signal s14 that is output from the comparator 42, and the drive speed is corrected by the obtained amount of correction. In this way, the tension control of this example is performed in an aspect of correcting the drive speed of each of the drive motors 24 (the delivery speed of the prepreg sheet 2) based on the detected tension value.

Note that, as described above, the comparison between the detected tension value and the target tension value in the comparator 42 is performed every predetermined period, and the deviation signal s14 is output to the computing unit each time the comparison is performed. The correction in the computing unit is executed when the deviation indicated by the deviation signal s14 is not 0 (zero). Further, the output of the drive command by the computing unit is stopped, in response to the input of the pulling-out completion signal s9, and the drive (control) of the drive motor 24 is stopped, as described above. Therefore, the tension control described above is also stopped at that time point.

According to the above configuration, as the pulling-out process is started, the drive of each of the drive motors 24 (the delivery of each of the prepreg sheets 2) is started at the basic speed in the supply device. During the delivery, when the tension of any one prepreg sheet 2 changes and a deviation occurs between the detected tension value and the target tension value, the amount of correction is obtained based on the deviation, and the drive speed at a time point when the tension changes (a time point when the deviation signal s14 is input) is corrected by the amount of correction. In this way, the drive command that is output from the computing unit to the motor controller becomes a speed command corresponding to the corrected drive speed, and the control on drive of each of the drive motors 24 in the motor controller is performed at the corrected drive speed.

For reference, when the deviation is a positive value, i.e., when the tension of the prepreg sheet 2 is greater than the target tension, the drive speed is corrected in a direction of increasing the speed. In addition, when the deviation is a negative value, i.e., when the tension of the prepreg sheet 2 is less than the target tension, the drive speed is corrected in a direction of decreasing the speed.

In this way, the drive speed is corrected so as to eliminate the deviation each time the deviation occurs, until the drive of each of the drive motors 24 is over. Therefore, the prepreg sheet 2 is delivered in a state where the tension thereof is maintained at the target tension. As a result, at the time point when the pulling-out process is over (at the time point when the drive of each of the drive motors 24 is over), the prepreg sheet 2 is in a state where the tension thereof is maintained at the target tension.

Note that, in the above, the tension control is executed during the pulling-out process. However, as for the control on drive of the drive motor 24 that is performed based on the detected tension value during the pulling-out process that is executed while rotationally driving the material roll 3 by the drive motor 24 (while actively delivering the prepreg sheet 2), the control is not limited to the configuration where the control is performed while correcting the drive speed according to the deviation obtained from the detected tension value, and may also be performed so that the drive speed is obtained as a speed corresponding to the deviation, like the above embodiment.

Further, in the case where the tension control is executed during the pulling-out process, the tension control is not limited to being executed only for the time period during the pulling-out process, and may also be continuously performed even after the pulling-out process is over. However, since the tension control that is performed after the pulling-out process drives the drive motor 24 according to the deviation of the detected tension value, when the tension control that is executed during the pulling-out process is performed in an aspect of correcting the drive speed of the drive motor 24 based on the detected tension value, as described above, the computing unit switches the drive command, which is output as the pulling-out completion signal s9 is input in response to the end of the pulling-out process, from a drive command indicating the drive speed that is obtained by the correction based on the basic speed or the deviation to a drive command indicating the drive speed corresponding to the deviation.

5) As for the tension control, in the above, the tension control is executed in a control aspect (first control aspect) of putting the prepreg sheet 2 in a loosened state during the pulling-out process and then matching the tension with the target tension or in a control aspect (second control aspect) of monitoring the tension of the prepreg sheet 2 during the pulling-out process and maintaining the tension at the target tension, and the same control aspect is applied to all the material rolls 3. However, the tension control is not limited to the configuration where the same control aspect is applied to all the material rolls 3, and a different control aspect may be applied according to a type of the prepreg sheet 2, and the like.

More specifically, the prepreg sheet 2 has such a property that an aspect (a degree of influence) of receiving an influence (damage and the like) on increase in tension is different depending on a width of the prepreg sheet, an orientation direction of the reinforced fiber, a type of a resin material and the like. For example, as for the orientation direction of the reinforced fiber, the smaller an angle of the orientation direction relative to the longitudinal direction of the prepreg sheet 2 is (the minimum is parallel and 0°, the less the degree of influence is. Further, in the first and second control aspects of the tension control, a state where the tension increases is more difficult to occur in the first control aspect.

Therefore, depending on the type of the material roll mounted to the supply device, and the like, the tension control that is applied to each of the material rolls may not be performed by such an aspect where the same control aspect is applied to all the material rolls, like the above embodiment, and may be instead performed by an aspect where the type of the material roll and the like are considered and the first or second aspect is then applied according to each of the considerations.

6) As for the setting device, in the above embodiment, the setting device is configured to be able to set the target tension value for each of the material rolls 3. In addition, in the above embodiment, each of the target tension values is set according to the type of the material roll 3. However, the target tension value is not limited to being set different for each type of the material rolls 3 and may be set to be the same even when the types of the material rolls are different. Specifically, even for the different types of the material rolls (a plurality of types of the material rolls), there are the material rolls for which the target tension value regarded as appropriate is the same. In addition, when an allowable range slightly wider than the target tension value regarded as appropriate is included, the same target tension value may be set for the different types of the material rolls, in some cases. In contrast, even for the same type of the material rolls, it may be preferable to set the target tension value different depending on the arrangement on the supply device (the path through which the prepreg sheet 2 is pulled out), and the like. Therefore, the target tension value for each of the material rolls is not limited to being determined according to the type of the material roll, and may be set as appropriate, considering various conditions and the like.

Further, in the case where the same type of the material rolls 3 are each plurality (2) mounted and the mounting method in the device is fixed, like the above embodiment, the setting device is not limited to the configuration where the target tension value is set for each of the mounted material rolls 3, like the above embodiment, and may set the target tension value for each group of the material rolls for which the same target tension value may be set.

7) As for the supply device, in the above embodiment, the supply device 4 is configured so that the ten material rolls 3 can be mounted. Further, in the supply device 4, the ten support shafts 14 for supporting the ten material rolls 3 are supported five by five by each of the upper beam material 12 and the lower beam material 12 of the supply device 4 so that the ten support shafts 14 are arranged five by five at the upper and lower sides. However, in the present invention, the supply device is not limited to the configuration, and may also be configured as follows, for example.

The supply device is not limited to the configuration where the ten material rolls 3 can be mounted (the ten support shafts 14 are provided). For example, since the necessary number of the material rolls is determined according to the fiber reinforced composite 5 to be formed in the continuous forming apparatus, the supply device may be configured so that the appropriate number of the material rolls can be mounted, considering the same.

Further, the supply device is not limited to the configuration where the material rolls 3 (support shafts 14) are arranged in two upper and lower rows, like the above embodiment, may also be configured so that all the material rolls (support shafts) are arranged in one row at the same height position.

Further, the supply device is not limited to the configuration where the material rolls 3 (support shafts 14) arranged at the same height position are supported by the same (common) beam material 12. For example, two or more independent frames may be provided, and the material rolls (support shafts) arranged at the same height position may be supported by the different beam materials.

For reference, in the above embodiment, the types of the material rolls mounted to the supply device are four types but are determined according to the fiber reinforced composite 5 to be formed, and are not limited to the four types. In addition, in the above embodiment, the matrix resin of the prepreg sheet of the material roll is the thermoplastic resin but may also be a thermosetting resin.

8) As for the supply device, in the above embodiment, the supply device 4 is configured so that the drive motor 24 for rotationally driving the material roll 3 and the tension detection mechanism 25 for detecting the tension of the prepreg sheet 2 are each provided for each of the material rolls 3 in a form corresponding to each of the material rolls 3. However, the supply device is not limited to the configuration where the drive motor 24 and the tension detection mechanism 25 are provided as described in the above embodiment, and may also have a configuration where the drive motor and the tension detection mechanism are commonly provided for the plurality of material rolls 3.

For example, the supply device may be configured so that one drive motor is provided for the two (or more) material rolls (support shafts 14 and 14) 3 and 3. Specifically, the supply device may be configured so that the plurality of material rolls 3 and 3 is rotationally driven by one drive motor. In this case, however, it is perferable that each of the material rolls to be rotationally driven by one drive motor should be one on which the same type (or a type for which the influence by the tension is substantially the same) of the prepreg sheet 2 is wound and should be arranged at positions at which there is little difference in influence on the tension by the path along which the prepreg sheet 2 is pulled out. In addition, since the material rolls are rotationally driven by the same amount, it is preferable that each of the material rolls should have substantially the same winding diameter in the fully-wound state.

As an example where the plurality of material rolls is rotationally driven by one drive motor, when the supply device 4 is configured so that the material rolls 3 are mounted two by two at the same position in the front and rear direction and the material rolls 3 on which the same type of the prepreg sheets 2 are wound are mounted at the same position in the front and rear direction, like the above embodiment, the two material rolls (the support shafts to which the material rolls are mounted) at the same position may be driven by one drive motor. Note that, the support shaft to which the material roll is mounted and the drive motor may be coupled to each other via a rotation transmission mechanism such as a gear train or a combination of a pulley and a belt.

Further, when the plurality of material rolls is rotationally driven by one drive motor, as described above, the tension detection mechanism may be each provided for each of the material rolls in a form corresponding to each of the material rolls, similar to the above embodiment, or may be provided for any one of the plurality of material rolls that are driven by the same drive motor.

However, when the tension detection mechanism is provided for each of the material rolls, the detected value signal s11 is output from each tension detection mechanism corresponding to each material roll to the tension detector of the drive controller for the drive motor configured to drive the plurality of material rolls. Therefore, in this case, for example, the tension detector of the drive controller may be configured to calculate an average value of the plurality of detected tension values obtained from each of the detected value signals s11 or to select any one of the plurality of detected tension values, as a representative value, and to output the tension signal s12 indicative of the calculated (averaged) detected tension value or the selected detected tension value to the comparator.

The present invention is not limited to any of the embodiments and can be changed as appropriate without departing from the gist of the present invention.

What is claimed is:

1. A continuous forming apparatus of a fiber reinforced composite comprising a supply device to which a plurality of material rolls, each of which is formed by a sheet shaped reinforced fiber base material wound in a roll shape, is mounted; a forming device configured to execute a forming process of pressurizing and heating the plurality of overlapped reinforced fiber base materials supplied from the supply device to form a fiber reinforced composite; and a pulling-out device configured to execute a pulling-out process of pulling out the fiber reinforced composite formed by the forming device by a predetermined pulling-out amount, wherein one forming operation consisting of the forming process by the forming device and the pulling-out process by the pulling-out device after the forming process is repeatedly performed, so that the fiber reinforced composite is continuously formed while pulling out the reinforced fiber base material from each of the material rolls, the continuous forming apparatus of a fiber reinforced composite being characterized by comprising:

one or more drive motors for rotationally driving the material rolls, the number of the one or more drive motors being equal to or smaller than a total number of the material rolls, and all the material rolls corresponding to any one of the one or more drive motors;

a tension detection mechanism provided to detect tension of the reinforced fiber base materials pulled out from the one or more material rolls of the material rolls corresponding to the one or more drive motors; and a drive control device configured to control drive of the one or more drive motors so that the material roll is rotationally driven in a delivery direction of the reinforced fiber base material during a time period from a time point of end of the pressurization in the forming process to a time point of end of the pulling-out process, wherein a time period of the pulling-out process or a part or whole of a time period from a time point of end of the pulling-out process to a time point of end of the pressurization in the forming process in a next forming operation is preset as a tension control time period, and the drive control device executes tension control for controlling drive of the one or more drive motors based on a detected tension value, which is obtained from a detected value obtained by the tension detection mechanism, and a target tension value that is a preset target tension value, during the tension control time period.

2. The continuous forming apparatus according to claim 1, wherein the tension control time period is set to the part or whole of the time period from the time point of end of the pulling-out process to the time point of end of the pressurization in the forming process in the next forming operation.

3. The continuous forming apparatus according to claim 1, wherein one of the one or more drive motors is provided for each of the material rolls.

4. The continuous forming apparatus according to claim 3, further comprising a setting device in which the target tension value is set,
wherein the setting device is configured to be able to set the target tension value for each of the material rolls.

5. The continuous forming apparatus according to claim 2, wherein one of the one or more drive motors is provided for each of the material rolls.

6. The continuous forming apparatus according to claim 5, further comprising a setting device in which the target tension value is set,
wherein the setting device is configured to be able to set the target tension value for each of the material rolls.

* * * * *